United States Patent Office

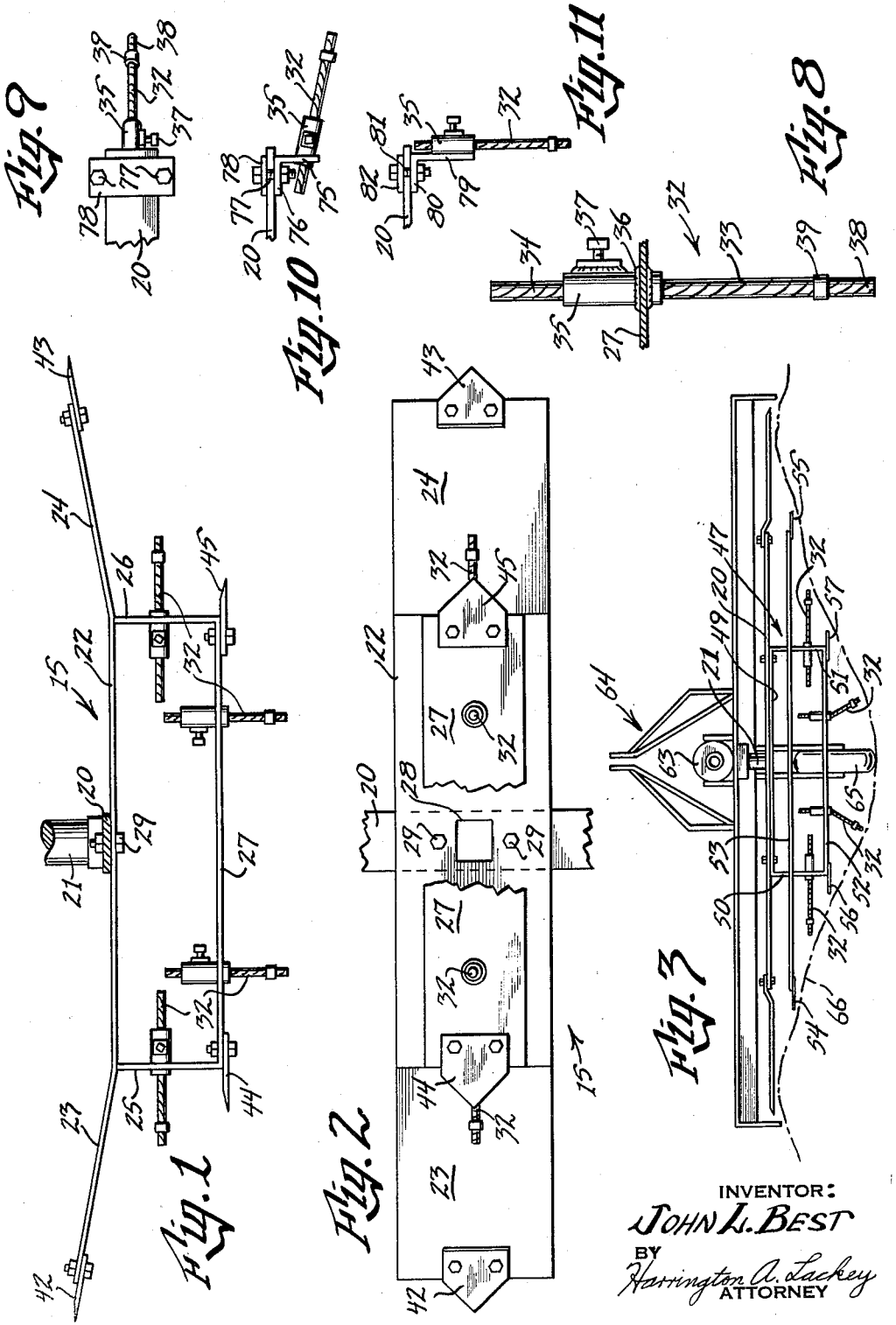

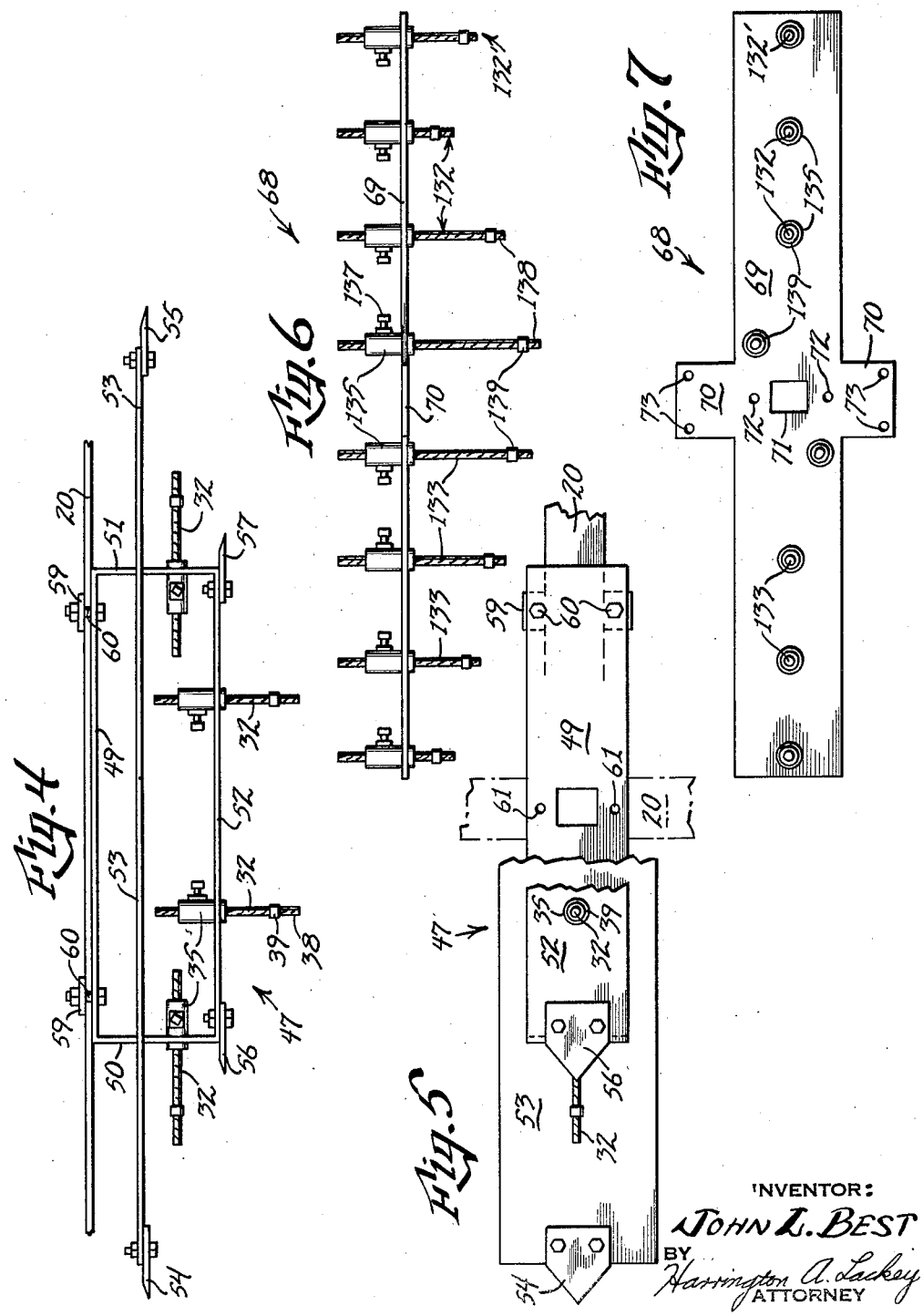

3,167,899
Patented Feb. 2, 1965

3,167,899
ROTARY APPARATUS FOR CLEARING FURROWS
John L. Best, P.O. Box 408, Milan, Tenn.
Filed Oct. 9, 1962, Ser. No. 229,352
6 Claims. (Cl. 56—25.4)

This invention relates to a rotary apparatus for clearing vines and other types of undergrowth and vegetation from land, and more particularly to a rotary apparatus for stripping or whipping out such vegetation from furrows.

Although there are many types of rotary apparatus, including rotary flails, for cutting, shredding and mulching many forms of vegetation and agricultural crops, still, none of these devices are adapted to clear vines and other types of undergrowth from furrowed ground.

It is therefore an object of this invention to provide a novel type rotary apparatus for clearing vines and other type vegetation from furrows.

Another object of this invention is to provide such a rotary apparatus incorporating a novel whip-like beater.

A further object of this invention is to provide a rotary apparatus for uniformly clearing furrows incorporating a plurality of whip-like beaters, which are readily adjustable to the depths and contours of the furrows to be cleared.

Another object of this invention is to provide an apparatus for clearing furrows, which may be readily attached to existing rotary cutter mechanism.

Another object of this invention is to provide a rotary apparatus for clearing furrows incorporating a novel combination of whip-like beaters and cutter blades adapted to conform to the contour of the furrow and to uniformly contact the vegetation in the furrow.

Another object of this invention is to provide a rotary apparatus for clearing furrows, which is particularly adapted to cut and whip out vines, and is particularly adaptable for the destruction of potato vines just before harvest.

Further objects and advantages of the invention will be apparent from the following description, taken in conjunction with the drawings, wherein:

FIG. 1 is a side elevation of one form of the invention attached to the existing cutter bar of a conventional cutter;

FIG. 2 is a bottom plan view of the invention disclosed in FIG. 1;

FIG. 3 is a front elevation of a modification of the device disclosed in FIG. 1, attached to a conventional rotary cutter for clearing a furrow;

FIG. 4 is an enlarged view of the modification disclosed in FIG. 3 showing the conventional cutter bar fragmentarily;

FIG. 5 is a bottom plan view of the device disclosed in FIG. 4, with parts broken away;

FIG. 6 is a side elevation of another modified form of the invention;

FIG. 7 is a bottom plan view of the device disclosed in FIG. 6;

FIG. 8 is an enlarged side elevation of a beater adjustably mounted on a portion of the frame;

FIG. 9 is a top fragmentary plan view of another means for mounting the beater on the frame;

FIG. 10 is a side elevation of the device disclosed in FIG. 9; and

FIG. 11 is a fragmentary side elevation of another means for mounting the beater on the frame.

The invention disclosed in FIGS. 1 and 2 is in the form of an attachment 15 to be mounted on a conventional main cutter arm or bar 20 supported on a rotary spindle 21, driven from any conventional source, not shown. The attachment 15 comprises a frame having an elongated rectangular top plate 22 with laterally extending upswept cutter bar portions 23 and 24. The frame also consists of depending side plates 25 and 26 and a bottom plate 27. The plates 25, 26 and 27 are of the same width, but slightly narrower than the top plate 22. The top of the side plates 25 and 26 may be fixed by any convenient means such as by welding to the portions of the top plate 22 joining the cutter arms 23 and 24. For ease in manufacturing, the top plate 22, and the cutter bars 23 and 24 may be made from a single rectangular strip of metal. The top plate 22 is provided with a hole 28 for receiving the bottom portion of the spindle 21. The top plate 22 is also mounted to the main cutter bar 20 by any convenient means such as the bolts 29 in such a manner that the top plate 22 is substantially at right angles to the main cutter bar 20, and the rotary axis of the spindle 21 coincides with the centers of the main cutter bar 20 and the top plate 22.

A plurality of whip-like beaters 32 are adjustably mounted in the frame 15 to rotate therewith. As disclosed in FIGS. 1 and 2, a beater 32 is mounted in each side plate 25 and 26 to extend laterally therefrom and substantially parallel to the longitudinal axis of the top plate 22. A pair of similar beaters 32 are also mounted to depend from the bottom plate 27, and are uniformly spaced on opposite sides of the rotary axis of the spindle 21.

The construction of each one of these beaters 32 is best disclosed in the enlarged view of FIG. 8. Although the beater 32 in FIG. 8 is disclosed as mounted on the bottom plate 27, it will be understood that the construction of the beater 32 will be the same for mounting on the side plates 25 and 26 and for mounting on other frame portions in other modifications of the invention, to be described later. Although the beater 32 might be a rigid elongated member, it preferably comprises a length of cable 33 formed of twisted steel strands. A twisted steel cable 33 having a ⅝-inch diameter has been employed very successfully in an apparatus made in accordance with this invention. The fixed or base end 34 of the cable 33 is adapted to be slidably received in a tubular collar 35, which is fixed in the frame portion 27 by any convenient means such as by welding 36. A set screw 37 threadedly engages a mating threaded opening in the collar 35 to engage and disengage the base end of the cable 34 and thereby lock the cable 33 in any longitudinally adjusted position. The free end 38 of the cable 33 is protected against ravelling of the steel strands by a ring 39, which is slip-fitted over the free end 38 and brazed in a position adjacent the free end 38, as disclosed in FIG. 8.

In addition to the beaters 32, upper cutter blades 42 and 43 are attached to the outer ends of the cutter arms 23 and 24, respectively, and lower cutter blades 44 and 45 are fixed to the ends of the bottom plate 27 to extend laterally outward beyond the side plates 25 and 26, as disclosed in FIGS. 1 and 2. These blades may be attached for lengthwise adjustment if desired.

It is also within the scope of this invention for the cutter blades 23 and 24 to be downswept as well as upswept. When the blades 23 and 24 are downswept, they are very effective for cleaning out potato vines on the side of a furrow. Moreover, each cutter blade 23 and 24, upswept or downswept, may be provided with a depending beater 32, if desired.

A slightly modified form of the invention is disclosed in FIGS. 3, 4 and 5 in which the frame 47 is rectangular, having a top plate 49, two end or side plates 50 and 51 and a bottom plate 52, all of substantially equal widths. The mid-portions of the end plates 50 and 51 are transversely split to receive an elongated cutter bar 53, which is substantially longer than and extends longitudinally through the frame 47. The extremities of the cutter bar 53 are provided with outwardly extending cutter blades 54 and 55. Lower cutter blades 56 and 57 are mounted on the bottom plate 52 to extend outwardly beyond the side plate 50 and 51 in the same manner as the cutter blades 44 and 45 in FIGS. 1 and 2.

In FIGS. 3, 4 and 5, the top plate 49 is mounted longitudinally parallel to the main cutter bar 20 of a conventional rotary cutter by means of straps 59. The straps 59 extend transversely across the main cutter bar 20 and are provided with threaded apertures adjacent either end for receiving the bolts 60 extending upwardly from the top plate 49. Since the top plate 49 is slightly wider than the main cutter bar 20, the bolts 60 pass adjacent the side edges of the main cutter bar 20 in order to retain it in fixed position.

As disclosed in FIG. 5, the frame 47 may be mounted at right angles to the main cutter bar 20 by providing threaded apertures 61 in the top plate 49 to receive the bolts 60, when the main cutter bar 20 is in the position disclosed in dashed lines in FIG. 5.

The frame 47 is adapted to support the cable beaters 32 substantially in the same manner as the frame 15 of FIGS. 1 and 2. A pair of beaters 32 are shown depending from the bottom plate 52 in the same manner as the corresponding beaters are suspended from the bottom plate 27. Another beater 32 extends laterally outwardly from each end plate 50 and 51 in the same manner as the beaters 32 extend laterally from the end plates 25 and 26. Moreover, the laterally extending beaters 32 in FIG. 4 are mounted below the cutter bar 53, as the beaters 32 in FIG. 1 are mounted below the cutter bars 23 and 24.

FIG. 3 discloses the apparatus 47 mounted parallel to the main cutter bar 20, which is supported on the rotary spindle 21 driven by the motor 63 in a conventional rotary cutter frame 64 mounted on a wheel 65. It will also be understood that the appartaus 15 may also be mounted on the same cutter frame 64 to perform in substantially the same manner as the device 47. It will be noted in both devices 15 and 47 that the free ends 38 of the beaters 32 and the cutter blades 42, 43, 44, 45, 54, 55, 56 and 57 form in their respective devices a contour adapted to conform to the contour of a furrow 66. In FIG. 3, for example, it will be noted that the wheel 65 is in substantially the center of the furrow 66 with the depending beaters 32 mounted in the bottom plate 52 located at a lower elevation than laterally extending beaters 32 in the end plates 50 and 51. The blades 56 and 57 are spaced outwardly and a little above the depending beaters 32 in the bottom plate 52, but inwardly and below the laterally extending beaters 32 in the side plates 50 and 51. Moreover, the blades 54 and 55 extend outwardly beyond and above the end beaters 32. Thus, all of the beaters 32 and the blades 54, 55, 56 and 57 are adapted to engage, cut and whip out any vegetation close to the contour of the furrow 66.

The whip-like action of the cable beater 32 has been found to be particularly effective in entwining and whipping out vines and other similar type vegetation. The strands of steel cable 33 provide a semi-flexible beater element 32, which is sufficiently resilient and blunt, as not to cut the vines, but to whip out the vines by the roots and yank them loose from the soil. FIG. 3 discloses the device 47 in rotary motion with the lower depending beaters 32 slanting outward by virtue of centrifugal force.

Another modified form of the invention is disclosed in FIGS. 6 and 7, in which the framework is considerably simpler, and no cutting elements are employed. The device 68 disclosed in FIGS. 6 and 7 employs an elongated rectangular frame bar 69 which has a pair of laterally oppositely disposed flanges 70 extending at right angles to the longitudinal axis of the bar 69 and located in the center thereof. The frame bar 69 is provided with an opening 71 to receive an extension of spindle 21, not shown. Threaded holes 72 are provided adjacent the opening 71 in order to receive bolts from a special spindle extension attachment, not shown, when the frame bar 69 is rigidly mounted parallel to the main cutter bar 20. The threaded holes 73 in the flanges 70 are provided to mount the frame bar 69 at right angles to the cutter bar 20, if desired.

The beaters 132 are identical in construction to the beaters 32 except that the cables 133 vary in length in order to conform with the contour of the furrow to be cleared. The cable 133 are slidably and adjustably received in tubular collars 135, which are identical to the collars 35, having adjustable set screws 137. The free ends 138 of the cables 133 are also provided with anti-ravelling rings 139. Although the beaters 32 in the devices 15 and 47 are mounted substantially symmetrically about the rotary axis, this arrangement is not necessarily mandatory, when the contour of the furrow is irregular. For example, it will be noted that the beater 132' at the right end of the frame bar 69 is slightly longer than its adjacent beater 132, in order that all beaters 132 and 132' will conform to an irregularly shaped contour substantially conforming to the free ends 138. Of course, the cables 133 may also be shortened or lengthened by adjusting their positions in the collars 135.

It is also within the scope of this invention to mount the beaters 32 and 132 directly upon the main cutter bar 20, as disclosed in FIGS. 9–11. FIGS. 9 and 10 disclose a beater 32 laterally supported in a downwardly diverging position on the end of the main cutter bar 20. The collar 35 is fixed in the side flange 75 of an angle member. The top flange 76 of the angle member is supported against the bottom of the main cutter bar 20 by bolts 77 depending from a strap 78.

FIG. 11 discloses a beater 32 depending at right angles from the end of the main cutter bar 20. The mounting collar 35 is fixed in a vertical position against the side flange 79 of an angle member. The top flange 80 of the angle member is supported against the bottom of the main cutter bar 20 by means of the bolts 81 depending through a strap 82 on top of the main cutter bar 20.

It will be understood that the mounting device as disclosed in FIGS. 9–11 can not only be employed upon the main cutter bar 20, but also be adapted to mount the beaters 132 and 132' on the ends of the frame bar 69. The beaters 32 disclosed in FIGS. 9–11 will perform in the same manner with their rapid and effective whip-like action, as they do when employed in the devices 15, 47 and 68.

It will be further understood that all the modifications of the invention may be incorporated in permanent machines, or they may be employed as attachments for existing rotary cutter machines.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A rotary apparatus for clearing a furrow comprising:
   (a) an elongated frame having upper and lower portions,
   (b) means for mounting the upper portion of said frame upon a rotary spindle for rotating about an axis through said upper and lower portions,
   (c) upper cutter blades fixed to and extending laterally from the upper portion of said frame,
   (d) lower cutter blades fixed to and extending laterally from the lower portion of said frame, and
   (e) a pair of flexible beaters fixedly mounted to the lower portion of said frame to depend below said frame, said beaters being spaced on opposite sides of said rotary axis.

2. The invention according to claim 1 in which said beaters comprise flexible cables mounted in the lower portion of said frame for axial ajustment.

3. The invention according to claim 1 in which said upper cutter blades are mounted on opposite sides of said rotary axis, and said lower cutter blades are mounted on opposite sides of said rotary axis.

4. The invention according to claim 3 in which said upper cutter blades extend laterally beyond the lateral extent of said lower cutter blades.

5. A rotary apparatus for clearing a furrow comprising:
(a) an elongated upper plate,
(b) means for mounting said upper plate on a rotary spindle for rotating about an axis through said upper plate,
(c) an elongated lower plate spaced below and rigidly fixed to said upper plate,
(d) upper cutter blades mounted on and extending laterally outwardly from said upper plate on opposite sides of said rotary axis,
(e) lower cutter blades mounted on and extending laterally outwardly from said lower plate on opposite sides of said rotary axis, and
(f) a pair of flexible beaters mounted in said lower plate to depend therefrom on opposite sides of said rotary axis.

6. The invention according to claim 5 in which said lower plate is rigidly fixed to said upper plate by means of upstanding side plates.

References Cited by the Examiner

UNITED STATES PATENTS

| | | | |
|---|---|---|---|
| 2,701,942 | 2/55 | Caldwell et al. | 56—503 X |
| 2,775,856 | 1/57 | Hoch | 56—25.4 |
| 2,995,884 | 8/61 | Pace | 56—29 |
| 3,082,829 | 3/63 | Buddingh et al. | 172—526 |
| 3,097,466 | 7/63 | King | 56—25.4 |

FOREIGN PATENTS

| | | |
|---|---|---|
| 207,844 | 3/57 | Australia. |
| 550,127 | 10/56 | Italy. |

T. GRAHAM CRAVER, *Primary Examiner.*

RUSSELL R. KINSEY, *Examiner.*